US012803796B2

(12) United States Patent
Zhu et al.

(10) Patent No.: US 12,803,796 B2
(45) Date of Patent: Nov. 17, 2026

(54) NETWORK KEY GENERATION METHOD AND SYSTEM BASED ON RANDOM CHANNEL AND DH NEGOTIATION

(71) Applicant: NANJING UNIVERSITY OF POSTS AND TELECOMMUNICATIONS, Jiangsu (CN)

(72) Inventors: Jia Zhu, Jiangsu (CN); Zhongmiao Chu, Jiangsu (CN); Yulong Zou, Jiangsu (CN); Wenke Cai, Jiangsu (CN); Xiaowei Fan, Jiangsu (CN); Yulei Lou, Jiangsu (CN)

(73) Assignee: NANJING UNIVERSITY OF POSTS AND TELECOMMUNICATIONS, Jiangsu (CN)

( * ) Notice: Subject to any disclaimer, the term of this patent is extended or adjusted under 35 U.S.C. 154(b) by 131 days.

(21) Appl. No.: 18/851,701

(22) PCT Filed: Jul. 27, 2023

(86) PCT No.: PCT/CN2023/109480

§ 371 (c)(1),
(2) Date: Sep. 27, 2024

(87) PCT Pub. No.: WO2024/212397

PCT Pub. Date: Oct. 17, 2024

(65) Prior Publication Data

US 2026/0172241 A1 Jun. 18, 2026

(30) Foreign Application Priority Data

Apr. 13, 2023 (CN) ......................... 202310391833.4

(51) Int. Cl.
*H04L 9/08* (2006.01)
*H04W 12/041* (2021.01)

(52) U.S. Cl.
CPC .......... *H04L 9/0861* (2013.01); *H04L 9/0841* (2013.01); *H04W 12/041* (2021.01)

(58) Field of Classification Search
None
See application file for complete search history.

(56) References Cited

U.S. PATENT DOCUMENTS

| | | | | |
|---|---|---|---|---|
| 8,238,551 B2 * | 8/2012 | Reznik | ................ | H04W 12/041 713/171 |
| 10,225,125 B2 * | 3/2019 | Sandell | ............... | H04L 27/2657 |

(Continued)

FOREIGN PATENT DOCUMENTS

| | | |
|---|---|---|
| CN | 102238116 | 11/2011 |
| CN | 108419235 | 8/2018 |

(Continued)

OTHER PUBLICATIONS

Zhang et al.; A New Frontier for IoT Security Emerging From Three Decades of Key Generation Relying on Wireless Channels; IEEE (Year: 2020).*

(Continued)

*Primary Examiner* — Teshome Hailu
*Assistant Examiner* — Mahabub S Ahmed
(74) *Attorney, Agent, or Firm* — JCIPRNET

(57) ABSTRACT

The present invention discloses a network key generation method and system based on a random channel and DH negotiation. The method includes: initiating, by a communication caller, a call to a communication responder via a network; transmitting, through a wireless channel by network access points close to the communication caller and the communication responder, a pilot training sequence to the caller and the responder respectively; based on a channel estimation method, extracting, by the two communication parties, wireless channel state information, to generate an (Continued)

initial bit sequence; and processing the initial bit sequence based on a DH negotiation algorithm, such that the two communication parties generate consistent end-to-end keys. The present invention improves key randomness, and solves the problem of a low key-generation rate in the conventional physical layer, thus improving reliability of physical layer key negotiation between the two communication parties.

7 Claims, 6 Drawing Sheets

(56) References Cited

U.S. PATENT DOCUMENTS

| | | | | |
|---|---|---|---|---|
| 10,462,837 | B2 * | 10/2019 | Escott | H04W 12/106 |
| 12,206,449 | B1 * | 1/2025 | Campos | H04B 10/071 |
| 12,224,860 | B1 * | 2/2025 | Shattil | H04L 1/0077 |
| 12,587,841 | B2 * | 3/2026 | Elshafie | G06F 21/606 |
| 2007/0036353 | A1 * | 2/2007 | Reznik | H04B 7/0434 380/30 |
| 2007/0058808 | A1 * | 3/2007 | Rudolf | H04L 9/0875 380/44 |
| 2007/0177729 | A1 * | 8/2007 | Reznik | H04K 1/00 380/44 |
| 2010/0034177 | A1 * | 2/2010 | Santhanam | H04W 52/50 370/447 |
| 2010/0091669 | A1 * | 4/2010 | Liu | H04L 45/20 370/252 |
| 2011/0275364 | A1 * | 11/2011 | Austin | H04L 41/06 455/423 |
| 2011/0286597 | A1 * | 11/2011 | Haddad | H04W 12/0431 380/270 |
| 2011/0319129 | A1 * | 12/2011 | Bhat | H04W 24/04 455/552.1 |
| 2014/0146916 | A1 * | 5/2014 | Shattil | H04J 13/004 375/295 |
| 2015/0195775 | A1 * | 7/2015 | Wirola | H04W 48/16 370/338 |
| 2016/0094542 | A1 * | 3/2016 | Lee | H04W 12/062 726/7 |
| 2016/0270018 | A1 * | 9/2016 | He | H04L 1/0003 |
| 2017/0012772 | A1 * | 1/2017 | Mueller | H04L 43/0876 |
| 2017/0126403 | A1 * | 5/2017 | Hong | H04L 9/085 |
| 2017/0187504 | A1 * | 6/2017 | Qian | H04W 72/0466 |
| 2017/0338956 | A1 * | 11/2017 | Badawy | H04W 12/033 |
| 2018/0013558 | A1 * | 1/2018 | Hassan | H04L 9/0861 |
| 2021/0226784 | A1 * | 7/2021 | Altun | H04L 25/024 |
| 2021/0378039 | A1 * | 12/2021 | Cherian | H04W 76/15 |
| 2023/0171096 | A1 * | 6/2023 | Lu | H04L 9/0869 380/44 |
| 2023/0344676 | A1 * | 10/2023 | Interdonato | H04L 25/0204 |
| 2024/0137957 | A1 * | 4/2024 | Soryal | H04W 4/025 |
| 2024/0187850 | A1 * | 6/2024 | Elshafie | G06F 21/606 |
| 2024/0236662 | A1 * | 7/2024 | Elshafie | H04W 12/041 |
| 2024/0298352 | A1 * | 9/2024 | Xia | H04W 74/002 |
| 2024/0396588 | A1 * | 11/2024 | Frenger | H04B 7/024 |
| 2024/0429965 | A1 * | 12/2024 | Deo | H04B 1/707 |
| 2025/0016556 | A1 * | 1/2025 | Elshafie | H04L 9/0875 |
| 2025/0159601 | A1 * | 5/2025 | Vieira | H04W 48/16 |
| 2025/0168741 | A1 * | 5/2025 | Tanaka | H04W 76/10 |
| 2025/0212259 | A1 * | 6/2025 | Elshafie | H04W 74/0833 |
| 2026/0005740 | A1 * | 1/2026 | Smeets | H04B 7/0617 |

FOREIGN PATENT DOCUMENTS

| | | |
|---|---|---|
| CN | 109600222 | 4/2019 |
| CN | 115037445 | 9/2022 |
| CN | 115396102 | 11/2022 |
| CN | 116112919 | 5/2023 |
| WO | 2015004286 | 1/2015 |
| WO | 2021022633 | 2/2021 |
| WO | 2021088213 | 5/2021 |

OTHER PUBLICATIONS

Ribouh et al.; Channel State Information-Based Cryptographic Key Generation for Intelligent Transportation Systems; IEEE (Year: 2021).*

Wang et al.; Cooperative Secret Key Generation from Phase Estimation in Narrowband Fading Channels; IEEE (Year: 2012).*

Hua; Generalized Channel Probing and Generalized Pre-Processing for Secret Key Generation; IEEE (Year: 2023).*

Ye et al.; Information-Theoretically Secret Key Generation for Fading Wireless Channels; IEEE (Year: 2010).*

Baksi et al.; Secret Key Generation With Precoding and Role Reversal in MIMO Wireless Systems; IEEE (Year: 2013).*

"International Search Report (Form PCT/ISA/210) of PCT/CN2023/109480", mailed on Nov. 29, 2023, pp. 1-45.

"Written Opinion of the International Searching Authority (Form PCT/ISA/237) of PCT/CN2023/109480", mailed on Nov. 29, 2023, pp. 1-5.

Ping Xu et al., "End-to-end key agreement based on mobile network", Journal of Northeast Petroleum University, vol. 36, Aug. 2012, pp. 1-7.

Shuo Yang et al., "Generation and Agreement of Secret Keys for Physical Layer Security Based on Wireless Channels", Computer Technology and Development, vol. 27, May 2017, pp. 1-5.

* cited by examiner

| Key length | 128bits | 256bits | 512bits | 1024bits |
| --- | --- | --- | --- | --- |
| Negotiation success rate | 96% | 96% | 92% | 90% |

FIG. 6

NETWORK KEY GENERATION METHOD AND SYSTEM BASED ON RANDOM CHANNEL AND DH NEGOTIATION

CROSS-REFERENCE TO RELATED APPLICATION

This application is a 371 of international application of PCT application serial no. PCT/CN2023/109480, filed on Jul. 27, 2023, which claims the priority benefit of China application no. 202310391833.4, filed on Apr. 13, 2023. The entirety of each of the above mentioned patent applications is hereby incorporated by reference herein and made a part of this specification.

TECHNICAL FIELD

The present invention relates to the field of wireless communication technologies, and in particular to a network key generation method and system based on a random channel and DH negotiation.

BACKGROUND

With the development of communication technologies and the continuous expansion of wireless communication application scenarios, there are increasingly higher requirements for confidentiality in the communications. Currently, wireless communication networks use symmetric/asymmetric encryption, which mainly depends on the complexity of a negotiation algorithm, as well as the key distribution and management mechanism. In the conventional asymmetric encryption process, public keys are generated according to an encryption algorithm by using private keys randomly generated by the communication parties, and then consistent symmetric keys are generated by exchanging the public keys of the two communication parties. In this process, the private keys are usually generated by a pseudo-random sequence generator. Such a random number generator generates random numbers according to a linear feedback shift register by inputting seed values, where commonly used pseudo-random sequences are m sequences and M sequences. However, a pseudo-random code is not truly random, but a periodic binary sequence. Such a sequence has a large enough period but still has a security risk of being stolen.

Meanwhile, physical layer key generation technology has attracted widespread attention because it utilizes propagation characteristics of the radio channel to enhance data confidentiality. The radio channel propagation characteristics include short-term reciprocity, spatial uniqueness, and temporal variability and the like of the channel. In the generation process of physical layer keys, the two communication parties extract uplink and downlink channel features of the wireless channel by means of the reciprocity of the wireless channel, to generate initial keys respectively so as to encrypt and decrypt the data. Based on the temporal variability of the channel, the key generation system can dynamically update the keys to ensure communication security. However, due to the presence of channel fading and the noise effect, the results of channel estimation by the two parties are not exactly the same, resulting in asymmetry of the generated keys. Therefore, a key negotiation mechanism is required to implement information reconciliation between the initial keys of the two communication parties. Among the current techniques related to physical layer key generation, consistency negotiation is performed for the keys by mainly using error-correcting codes. There is a key leakage risk during the negotiation interaction process. In addition, these negotiation means, such as BCH error-correcting codes and Hamming codes, have fault tolerance for keystreams of different lengths and are unable to perform error correction for inconsistent bits if exceeding its fault tolerance. As a result, the two communication parties cannot generate symmetric keys, reducing the key generation rate of the two communication parties. To sum up, there is a potential reliability risk in existing information negotiation methods.

SUMMARY

To solve the above technical problems, the present invention provides a network key generation method and system based on a random channel and DH negotiation, which improve key randomness by means of spatial uniqueness and temporal variability of the wireless random channel and further solve the problem of low key-generation rate in the conventional physical layer by means of an asymmetric encryption algorithm, thus improving reliability of physical layer key negotiation between two communication parties.

The network key generation method based on a random channel and DH negotiation described by the present invention includes the following steps:

- initiating, by a communication caller, a call to a communication responder via a network; transmitting, through a wireless channel by network access points close to the communication caller and the communication responder, a pilot training sequence to the caller and the responder respectively;
- receiving, by the two communication parties, the pilot training sequence, performing estimation processing on the wireless channel to obtain wireless channel state information, and coding the wireless channel state information to generate an initial bit sequence; and
- performing, by the two communication parties, negotiation processing for the generated initial bit sequence according to a DH negotiation principle, and generating consistent end-to-end keys by means of network transmission.

Further, the process of performing, by the two communication parties, estimation processing for the wireless channel, to obtain wireless channel state information includes:

- transmitting, through the wireless channel by the network access points close to the communication caller and the communication responder, the pilot training sequence N times to the caller and the responder respectively;
- after each reception of the pilot training sequence from its corresponding network access point, performing, by the communication caller, channel estimation processing for the wireless channel where the received pilot is in, to obtain one-bit channel state information at an instantaneous moment; merging each bit of channel state information obtained after N channel estimations, to generate a wireless channel state information sequence, with a length of N bits, corresponding to its network access point, which is recorded as $S_A=\{s_A(1), s_A(2), \ldots, s_A(n), \ldots, s_A(N)\}$, where $s_A(n)$ denotes the nth-bit channel state information in the channel state information sequence $S_A$ and n denotes an integer from 1 to N; and
- likewise, performing, by the communication responder, the foregoing similar operation, to generate a wireless channel state information sequence, with a length of N bits, corresponding to its network access point, which is recorded as $S_B=\{s_B(1), s_B(2), \ldots, s_B(n), \ldots, s_B(N)\}$, where $s_B(n)$ denotes the nth-bit channel state information in the channel state information sequence $S_B$ and n denotes an integer from 1 to N.

Further, the process of coding the estimated channel state information to generate an initial bit sequence includes:

extracting, respectively by the communication caller and the communication responder, random channel information, such as amplitude, phase, signal-to-noise ratio, and the like, from each bit of channel state information in the sequences $S_A$ and $S_B$, and coding related random channel information to generate the initial bit sequence.

Further, the process of negotiating, by the two communication parties, about the initial bit sequence and generating consistent end-to-end keys via the network includes:

dividing, by the two communication parties, the respectively generated initial bit sequence into M sub-sequences; and respectively generating a new common sequence based on a DH negotiation algorithm by calculation, and transmitting the respectively generated common sequences to each other via the network; and upon receiving the common sequence transmitted by the other party, obtaining, by the two communication parties, consistent end-to-end keys according to the DH negotiation algorithm by using the respectively generated initial bit sequences.

Further, the process of generating the new common sequence based on the DH negotiation algorithm is as follows:

converting, by the communication caller, the M sub-sequences obtained after division into decimal numbers successively, and combining the decimal numbers into a decimal initial sequence which is recorded as $X_A=\{x_A(1), x_A(2), \ldots, x_A(m), \ldots, x_A(M)\}$, where $x_A(m)$ denotes the mth decimal number in the initial sequence $X_A$ generated by the communication caller, and m is an integer from 1 to M;

likewise, converting, by the communication responder, the M sub-sequences obtained after division into decimal numbers successively, and generating an initial sequence which is recorded as $X_B=\{x_B(1), x_B(2), \ldots, x_B(m), \ldots, x_B(M)\}$, where $x_B(m)$ denotes the mth decimal number in the initial sequence $X_B$ generated by the communication responder;

in addition, generating, by the communication caller, a set of binary information (p,g), where p is a prime number and g is an integer, and a set $\{g^x \bmod p|x=1, 2, \ldots, p-1\}$ is equivalent to a set $\{1, 2, \ldots, p-1\}$, mod denoting a remainder operator; and performing, by the communication caller, calculation according to the initial sequence $X_A$ and the binary information (p,g) by using the following formula, to obtain a common sequence element $y_A(m)$:

$$y_A(m) = g^{x_A(m)} \bmod p$$

where m is an integer from 1 to M; combining $y_B(m)$ obtained after calculation into a common sequence which is recorded as $Y_A=\{y_A(1), y_A(2), \ldots, y_A(m), \ldots, y_A(M)\}$; and afterwards, transmitting, by the communication caller, the common sequence $Y_A$ and the binary information (p,g) generated by itself to the communication responder via the network.

meanwhile, performing, by the communication responder, calculation according to the initial sequence $X_B$ and the binary information (p,g) generated by itself by using the following formula, to obtain a common sequence element $y_B(m)$:

$$y_B(m) = g^{x_B(m)} \bmod p$$

where m is an integer from 1 to M; combining $y_B(m)$ obtained after calculation into a common sequence which is recorded as $Y_B=\{y_B(1), y_B(2), \ldots, y_B(m), \ldots, y_B(M)\}$; and afterwards, transmitting, by the communication responder, the common sequence $Y_B$ generated by itself to the communication caller via the network.

Further, the process of obtaining the end-to-end keys according to the DH negotiation algorithm is as follows:

upon receiving the common sequence $Y_B$ from the communication responder via the network, performing, by the communication caller, calculation by means of the prime number p and the initial sequence $X_A$ generated by itself by using the following formula, to obtain a key sequence element $z_A(m)$:

$$z_A(m) = y_B(m)^{x_A(m)} \bmod p$$

where m is an integer from 1 to M; combining $z_A(m)$ obtained after calculation into a key sequence which is recorded as $Z_A=\{z_A(1), z_A(2), \ldots, z_A(m), \ldots, z_A(M)\}$; likewise, upon receiving the common sequence $Y_A$ from the communication caller via the network, performing, by the communication responder, calculation by means of the prime number p and the initial sequence $X_B$ generated by itself by using the following formula, to obtain a key sequence element $z_B(m)$:

$$z_B(m) = y_A(m)^{x_B(m)} \bmod p$$

where m is an integer from 1 to M; combining $z_B(m)$ obtained after calculation into a key sequence which is recorded as $Z_B=\{z_B(1), z_B(2), \ldots, z_B(m), \ldots, z_B(M)\}$; and finally, coding, by the two communication parties, the key sequences $Z_A$ and $Z_B$ respectively obtained after calculation and converting them into binary bit sequences, to generate consistent end-to-end keys.

A network key generation system based on a random channel and DH negotiation, includes a signal transceiver module, a channel estimation module, an initial bit sequence generation module, and a key negotiation module, where:

the signal transceiver module is configured for signal transmitting and receiving between a communication caller, a communication responder, and the network;

the channel estimation module is configured for the two communication parties to perform channel estimation processing on a wireless channel through which a network access point transmits signals, to obtain channel state information;

an initial bit sequence generation module is configured to obtain related data information from the channel state information obtained after estimation, and code the information to generate an initial bit sequence; and a key negotiation module is configured for the two communication parties to generate consistent end-to-end keys according to a DH negotiation algorithm and by means of the generated initial bit sequence.

Further, a cooperative operation process of the modules is as follows:

first, the network assigns an access point to the communication caller and the communication responder separately, and the two assigned network access points respectively transmit a pilot training sequence to the communication caller and the communication responder by using their respective signal transceiver modules;

next, the two communication parties respectively generate an initial bit sequence by using the channel estimation module and the initial bit sequence generation module;

then, the two communication parties respectively generate a common sequence by using the key negotiation module, and transmit the common sequences to each other via the network; and finally, the two communication parties receive common sequence information transmitted via the network by using their respective signal transceiver modules, and generate consistent end-to-end keys by using the key negotiation module.

The present invention has the following beneficial effects: In the method of the present invention, the initial bit sequence is extracted from instantaneous channel state information obtained by channel estimation. Compared to conventional generation of the initial key by a pseudo-random sequence generator, the key generated by the present invention has higher randomness because the wireless channel has spatial uniqueness and temporal variability. In the key negotiation process described in the method of the present invention, by means of the DH algorithm in asymmetric encryption, the technical problem that an illegal communication party steals information about the initial bit sequence in the data transmission process is solved. When this method is applied to generation of physical-layer keys, the problem of a low key-generation rate caused by limitations in negotiation based on an error correcting code in the conventional physical-layer security can be solved, thus further improving the key generation rate.

BRIEF DESCRIPTION OF THE DRAWINGS

FIG. 6 shows a negotiation success rate of generating keys of different lengths by using the method of the present invention.

DETAILED DESCRIPTION OF THE INVENTION

In order to make the content of the present invention more easily and clearly comprehended, the present invention is further described in detail below according to specific embodiments and with reference to the accompanying drawings.

Figure 1:
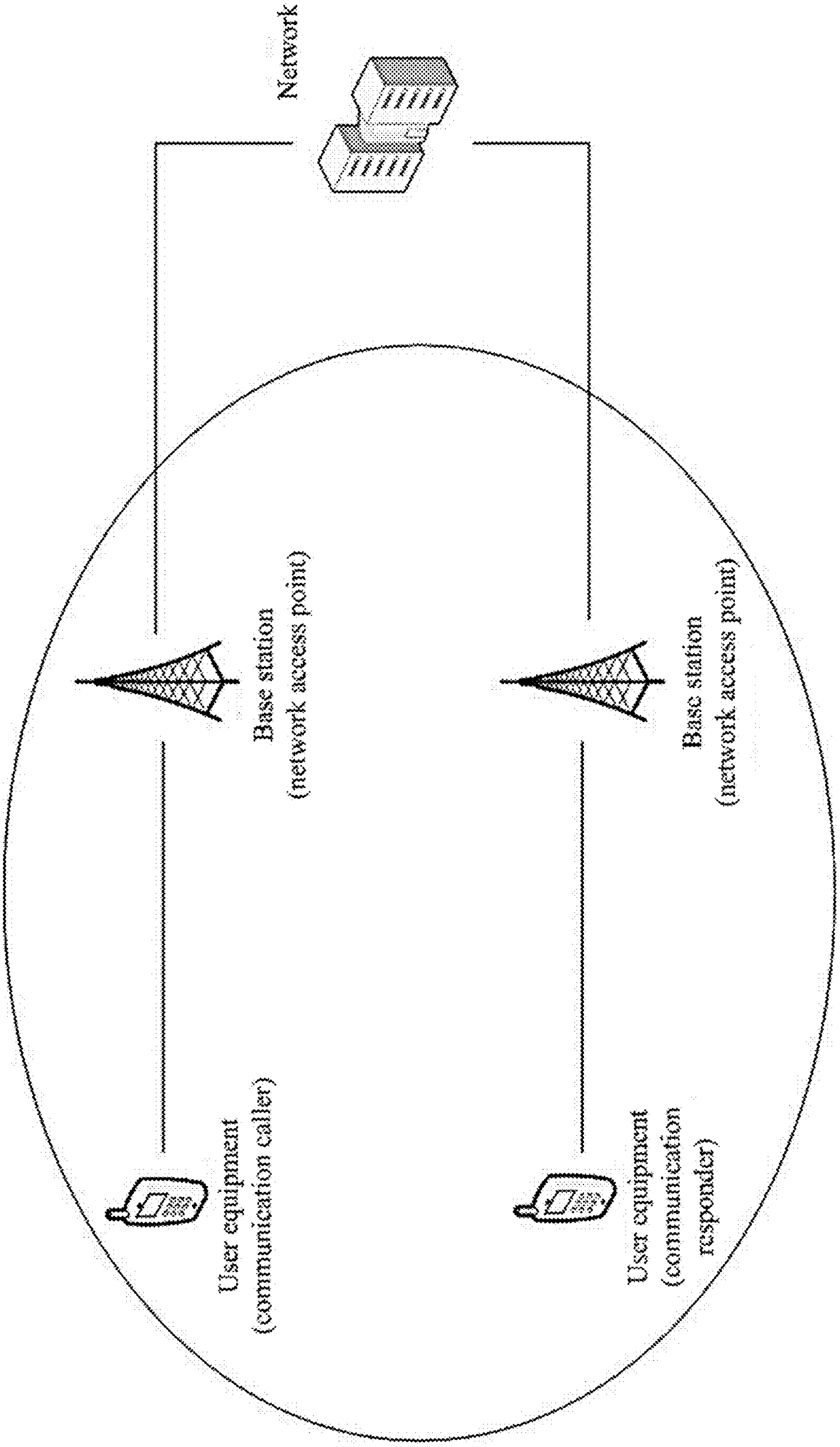
FIG. 1 is a schematic diagram of a real scenario provided by an embodiment of the present invention.
Figure 2:
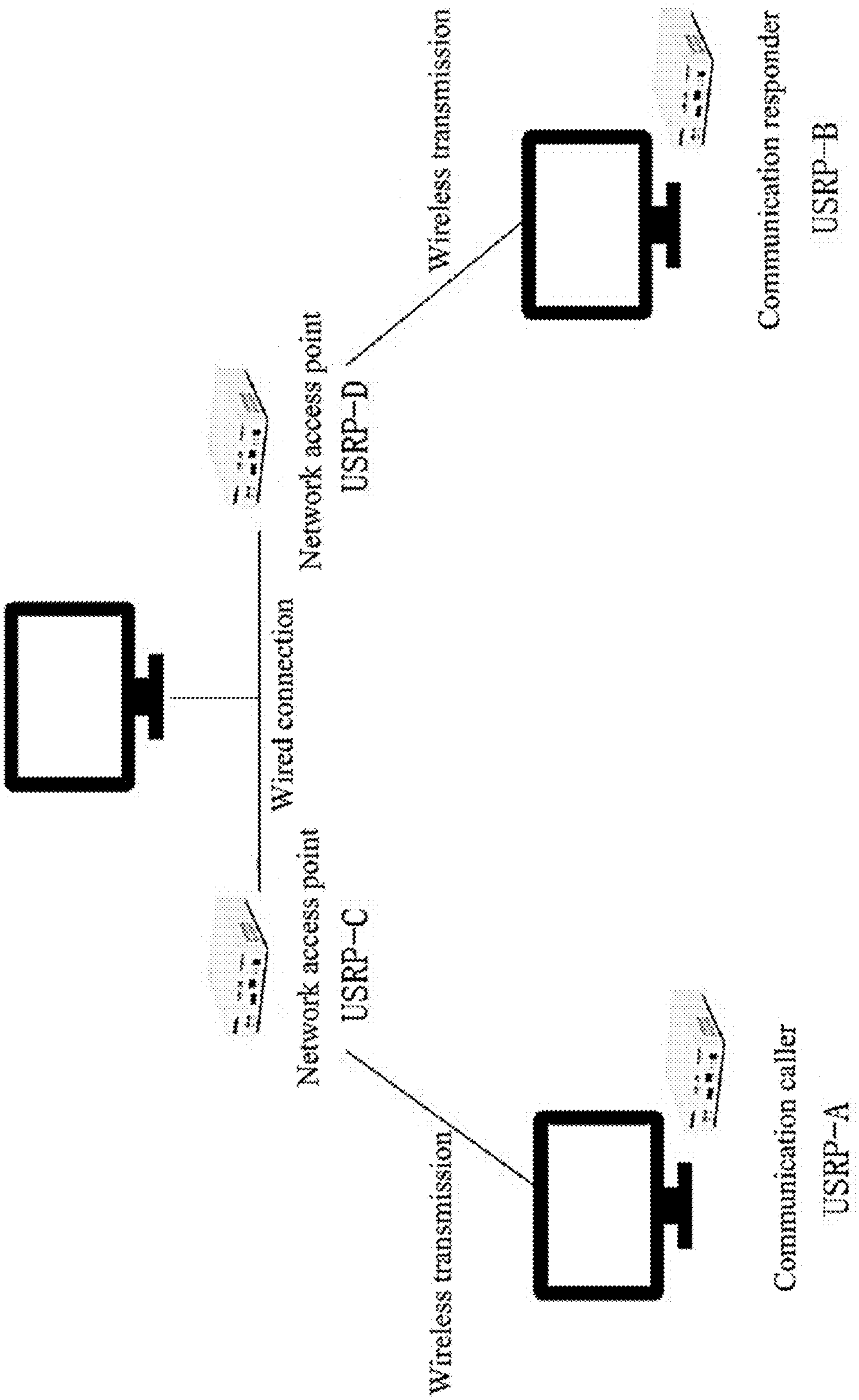
FIG. 2 is a schematic diagram of a simulation platform provided by an embodiment of the present invention.

An embodiment of the present invention provides a network end-to-end key generation system based on a random channel and DH negotiation. As shown in FIGS. 1 and 2, a wireless communication system composed of a communication caller, a communication responder, and a network is built by using four model-2920 software radio devices USRP and three PCs installed with LabVIEW software. The wireless communication system in the figures consists of a communication caller (USRP-A), a communication responder (USRP-B), a network access point (USRP-C) close to the communication caller, and a network access point (USRP-D) close to the communication responder.

Figure 4:
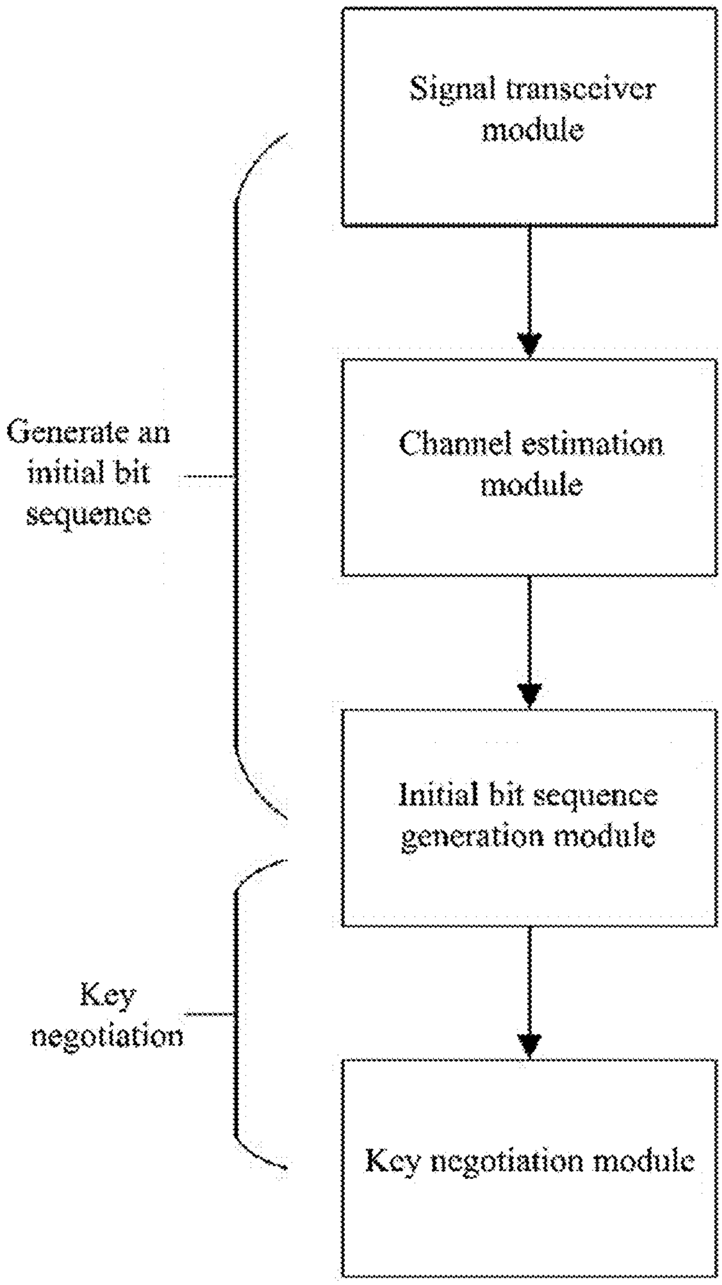
FIG. 4 is a schematic structural diagram of a system of the present invention.

As shown in FIG. 4, a network key generation system based on a random channel and DH negotiation described in the present invention includes a signal transceiver module, a channel estimation module, an initial bit sequence generation module, and a key negotiation module. The signal transceiver module is configured for signal transmitting and receiving between the communication caller, the communication responder, and the network. The channel estimation module is configured for the two communication parties to perform channel estimation processing on wireless channels of the network access points that transmit signals, to obtain channel state information. The initial bit sequence generation module is configured to obtain related data information from the channel state information obtained after estimation, and code the information to generate an initial bit sequence. The key negotiation module is configured for the two communication parties to generate consistent end-to-end keys according to a DH negotiation algorithm and by means of the generated initial bit sequence.

Figure 3:
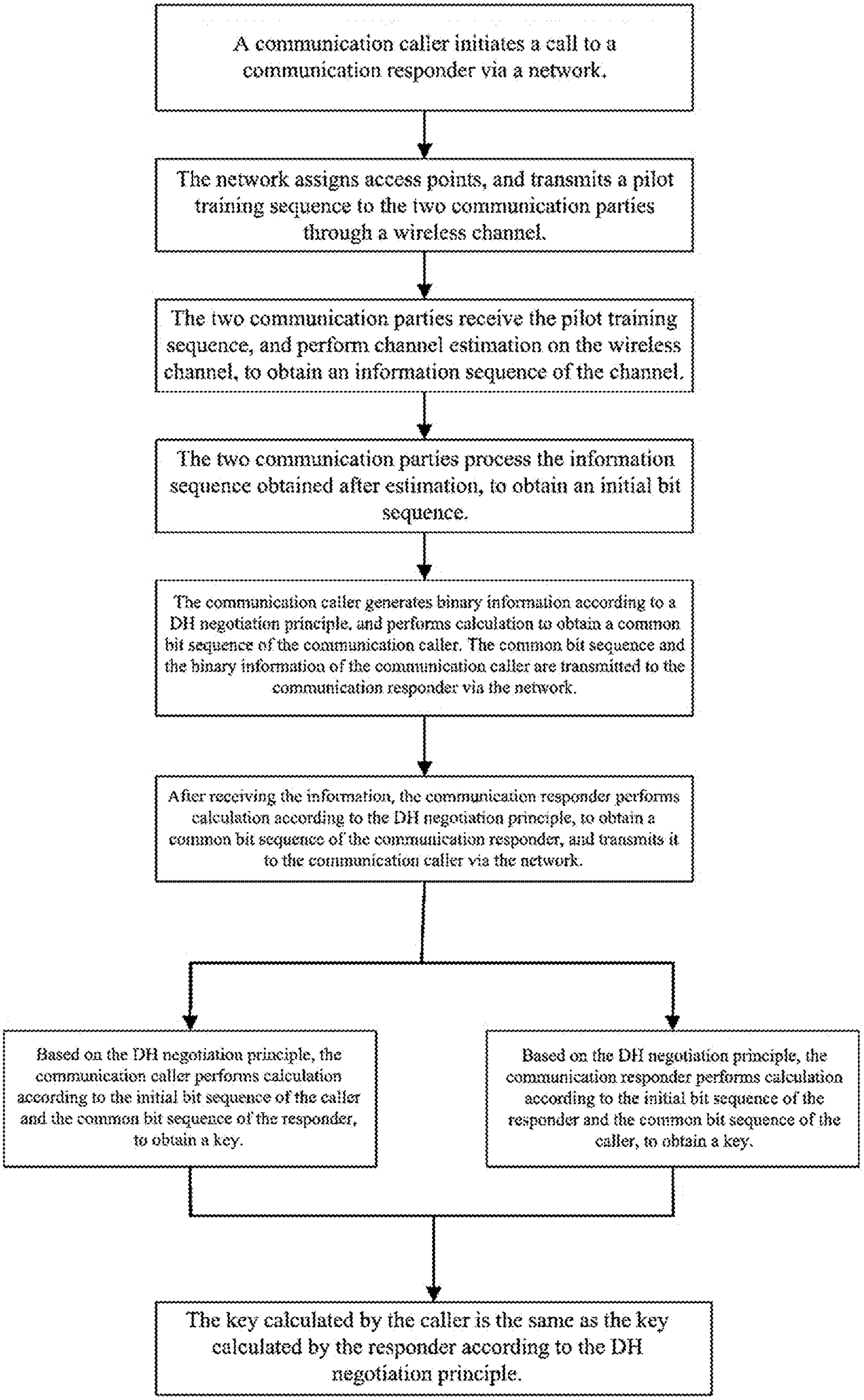
FIG. 3 is a flowchart of a method of the present invention.

As shown in FIG. 3, a network key generation method based on a random channel and DH negotiation described by the present invention specifically includes the following steps:

initiating, by a communication caller, a call to a communication responder via a network;

transmitting, through a wireless channel by network access points close to the communication caller and the communication responder, a pilot training sequence to the caller and the responder respectively;

receiving, by the two communication parties, the pilot training sequence, performing estimation processing on the wireless channel to obtain wireless channel state information, and coding the information to generate an initial bit sequence; and performing, by the two communication parties, negotiation processing for the generated initial bit sequence according to a DH negotiation principle, and generating consistent end-to-end keys by means of network transmission.

A generation process of the initial bit sequence is as follows:

Step 1a: The communication caller initiates an encryption request to the communication responder via a network, and after receiving the request, the communication responder transmits to the network a signal to agree the encryption request.

Step 2a: After receiving the signal, the network assigns a network access point close to the communication caller and transmits the pilot training sequence modulated via QPSK N times to the communication caller over a channel $H_1$. After each reception and demodulation of the pilot training sequence, the communication caller obtains one-bit channel state information at an instantaneous moment regarding the channel $H_1$ by means of a Minimum Mean Square Error (MMSE) algorithm. The channel state information obtained after N channel estimations are combined to generate a wireless channel state information sequence, with a length of N bits, corresponding to its network access point, which is recorded as $S_A=\{s_A(1), s_A(2), \ldots, s_A(n), \ldots, s_A(N)\}$, where $s_A(n)$ denotes the nth-bit channel state information in the channel state information sequence $S_A$ and n denotes an integer from 1 to N.

Meanwhile, the network assigns a network access point close to the communication responder and transmits the pilot training sequence modulated via QPSK N times to the communication responder over a channel $H_2$. The communication responder performs the foregoing similar operation to generate a wireless channel state information sequence of the communication responder, which is recorded as $S_B=\{s_B(1), s_B(2), \ldots, s_B(n), \ldots, s_B(N)\}$, where $s_B(n)$ denotes the nth-bit channel state information in the channel state information sequence $S_B$ and n denotes an integer from 1 to N.

Step 3a: The communication caller processes each bit of channel state information in the information sequence $S_A$, and extracts an amplitude value $R_A(n)$ and a phase value $\theta_A(n)$. A specific calculation formula is as follows:

$$R_A(n) = \sqrt{imf_A(n)^2 + remf_A(n)^2}$$

$$\theta_A(n) = \arctan\left(imf_A(n)/remf_A(n)\right)$$

$remf_A(n)$ and $imf_A(n)$ respectively denote a real part and an imaginary part of the channel state information $s_A(n)$. Then, each bit of amplitude and phase information obtained after calculation is converted into a binary sequence, and the sequences are combined and connected, to generate an initial bit sequence of the communication caller that is recorded as $L_A$.

The communication responder performs similar operations for the information sequence $S_B$, to generate a binary initial bit sequence that is recorded as $L_B$.

A key negotiation process is as follows:

Step 1b: The communication caller divides the generated initial bit sequence $L_A$ into M sub-sequences, converts each sub-sequence into a decimal number, combines the decimal numbers into a decimal initial sequence recorded as $X_A=\{x_A(1), x_A(2), \ldots, x_A(m), \ldots, x_A(M)\}$, where $x_A(m)$ denotes the mth decimal number in the initial sequence $X_A$ generated by the communication caller, and m denotes an integer from 1 to M.

The communication responder performs the foregoing similar processing on the generated initial bit sequence $L_B$, to obtain a decimal initial sequence which is recorded as $X_B=\{x_B(1), x_B(2), \ldots, x_B(m), \ldots, x_B(M)\}$, where $x_B(m)$ denotes the mth decimal number in the initial sequence $X_B$ generated by the communication responder and m denotes an integer from 1 to M.

Step 2b: The communication caller generates a set of binary information (p,g) according to a DH negotiation algorithm, where p is a prime number and g is an integer, and a set $\{g^x \bmod p \mid x=1, 2, \ldots, p-1\}$ is equivalent to a set $\{1, 2, \ldots, p-1\}$, mod denoting a remainder operator.

The communication caller performs calculation according to the initial sequence $X_A$ and the binary information (p,g) by using the following formula, to obtain a common sequence element $y_A(m)$:

$$y_A(m) = g^{x_A(m)} \bmod p$$

In the formula, m is an integer from 1 to M. $y_A(m)$ obtained after calculation is combined into a common sequence which is recorded as $Y_A=\{y_A(1), y_A(2), \ldots, y_A(m), \ldots, y_A(M)\}$; and afterwards, the communication caller converts the obtained common sequence Y into a binary common bit sequence $L_A$.

Step 3b: The communication caller merges the binary common bit sequence $L_A$ and the binary information (p,g) and transmits the merged information to the communication responder. The communication responder receives the information and extracts the common bit sequence and the binary information from the communication caller.

Step 4b: The communication responder performs calculation according to the initial sequence $X_B$ and the binary information (p,g) by using the following formula, to obtain a common sequence element $y_B(m)$:

$$y_B(m) = g^{x_B(m)} \bmod p$$

In the formula, m is an integer from 1 to M. $Y_B(m)$ obtained after calculation is combined into a common sequence which is recorded as $Y_B=\{y_B(1), y_B(2), \ldots, y_B(f), \ldots, y_B(M)\}$. Afterwards, the communication responder converts the obtained common sequence $Y_B$ into a binary common bit sequence $\hat{L}_B$, and transmits the sequence $\hat{L}_B$ to the communication caller via the network.

Step 5b: The communication caller processes the received common bit sequence $\hat{L}_B$, to obtain a common sequence $Y_B$ of the communication responder; and based on the DH negotiation principle, performs calculation according to the initial sequence $X_A$ and the binary information (p,g) of the communication caller and by using the following formula, to obtain a key sequence element $z_A(m)$:

$$z_A(m) = y_B(m)^{x_A(m)} \bmod p$$

In the formula, m is an integer from 1 to M. $z_A(m)$ obtained after calculation is combined into a key sequence which is recorded as $Z_A=\{z_A(1), z_A(2), \ldots, z_A(m), \ldots, z_A(M)\}$. Further, the decimal sequence $Z_A$ is converted into a binary sequence, to obtain a key $Key_A$.

The communication responder performs the foregoing similar operations: processing the common bit sequence $L_A$ transmitted by the communication caller to obtain a common sequence $Y_A$ of the communication caller; and performing calculation according to the initial sequence $X_B$ and the binary information (p,g) of the communication responder and by using the following formula, to obtain a key sequence element $z_B(n)$:

$$z_B(m) = y_A(m)^{x_B(m)} \bmod p$$

In the formula, m is an integer from 1 to M. $z_B(m)$ obtained after calculation is combined into a key sequence which is recorded as $Z_B=\{z_B(1), z_B(2), \ldots, z_B(m), \ldots, z_B(M)\}$. Further, the decimal sequence $Z_B$ is converted into a binary sequence, to obtain a key $Key_B$.

According to the principle of the DH asymmetric negotiation algorithm, the obtained sequences $Z_A=Z_B$, that is, $Key_A=Key_B$.

The foregoing embodiment is applicable to generation of network end-to-end keys. It should be noted that, this method also applies in the case of direct connection of user's communication devices.

Figure 5:
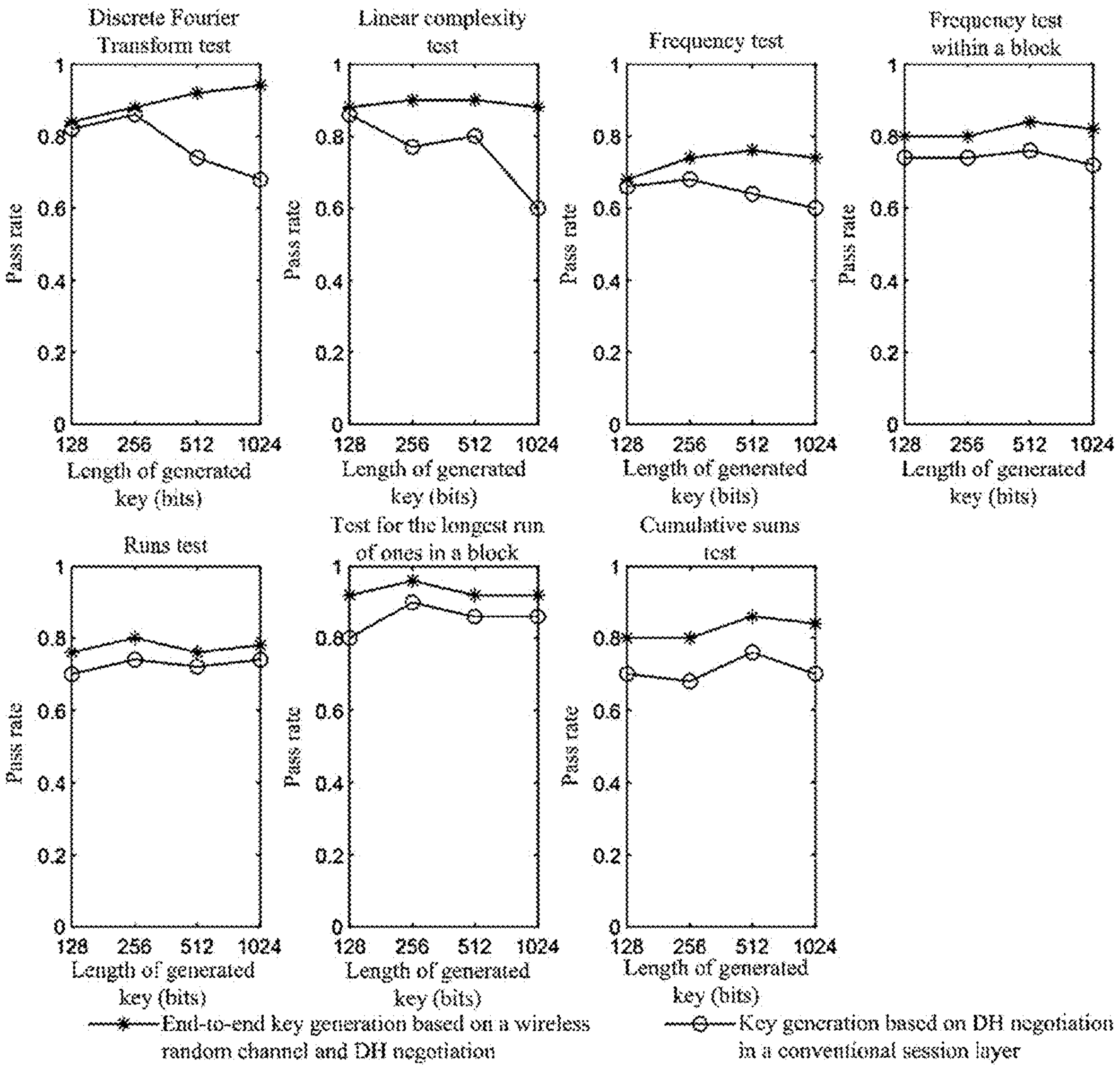
FIG. 5 is a chart showing comparison results of conducting an NIST randomness test respectively on keys of different lengths generated by using the method of the present invention and the conventional DH negotiation method.

The present invention tests the strength of the randomness of the keys generated by the system by using seven randomness test methods officially offered by NIST, and makes comparison between keys of different lengths that are respectively generated by the system of the present invention and the conventional session-layer DH negotiation system. The results are shown in FIG. 5 and the detection includes the following content:

Discrete Fourier transform test, which mainly performs a distributed Fourier transform on the sequence to observe a peak height, and detects the periodicity of the sequence;

Linear complexity test, which mainly determines whether the complexity of the sequence reaches the degree of being considered as a random sequence, the random sequence having a relatively long linear feedback shift register;

Frequency test, which mainly determines whether the numbers of "1" and "0" in the sequence are approximately equal to the numbers of "1" and "0" in the real random sequence;

Frequency test within a block, which mainly determines whether the frequency of "1" within an H-bit sub-block of a sequence is the same as that expected for the random sequence, which approximates H/2;

Runs test, which mainly compares whether the numbers of the runs "1" and "0" of different lengths are consistent with expected values in the ideal random sequence;

Test for the longest run of ones in a block, which mainly determines whether the length of the longest run "1" in a sequence to be tested is approximately same as that in the random sequence; and Cumulative sums test, which mainly determines whether the cumulative sum of a sequence is too large or too small relative to the expected cumulative sum, for the random sequence, the deviation of the random walk being around 0.

The test collects 100 sets of experimental data about the end-to-end keys of 128 bits, 256 bits, 512 bits, and 1024 bits that are generated respectively by the system of the present invention and the conventional session-layer DH negotiation system, and conducts the foregoing seven randomness tests for the keys generated each time. During the test, in the process of generating the end-to-end keys by the system, a 16-bit initial bit sequence generated each time after channel estimation by the two communication parties is subjected to 8, 16, 32, and 64 channel estimations, to generate end-to-end keys of 128 bits, 256 bits, 512 bits, and 1024 bits. The number of experimental sets for a NIST randomness test method is $K_p$, and the strength of randomness of the end-to-end keys generated by the two communication parties is measured with a pass rate P, where the pass rate P is calculated as follows:

$$P = \frac{K_P}{100}.$$

The results show that the keys obtained by using the network end-to-end key generation method based on a wireless random channel and DH negotiation are superior in all aspects and has excellent randomness.

Meanwhile, a negotiation success rate in a case where keys of different lengths are generated by the method of the present invention is tested, and specific results are shown in FIG. 6, where keys having the lengths of 128 bits, 256 bits, 512 bits, and 1024 bits are respectively generated 100 times, the number of successful negotiations is $K_q$, and the negotiation success rate Q is calculated as follows:

$$Q = \frac{K_q}{100}.$$

The above only describes preferred embodiments of the present invention, and is not intended to further limit the present invention. All equivalent changes made from the contents of the specification and the accompanying drawings of the present invention fall within the scope of protection of the present invention.

The invention claimed is:

1. A network key generation method based on a random channel and Diffie-Hellman (DH) negotiation, comprising the following steps:

initiating, by a communication caller, a call to a communication responder via a network;

transmitting, through a wireless channel by network access points within defined threshold distances of the communication caller and the communication responder, a pilot training sequence N times to the communication caller and the communication responder respectively;

receiving, by two communication parties comprising the communication caller and the communication responder, the pilot training sequence transmitted N times, after each reception of the pilot training sequence from a corresponding network access point, performing, respectively by the communication caller and the communication responder, channel estimation processing on the wireless channel used to transmit the pilot training sequence to obtain one-bit wireless channel state information at an instantaneous moment, merging each bit of the wireless channel state information obtained after N channel estimations to generate a wireless channel state information sequence having a length of N bits corresponding to the respective network access point; and coding the wireless channel state information sequences of each of the communication caller and the communication responder to generate an initial bit sequence; and performing, by the two communication parties, negotiation processing for the generated initial bit sequence according to a DH negotiation principle, and generating consistent end-to-end keys by means of network transmission.

2. The network key generation method based on a random channel and DH negotiation according to claim 1, wherein the process of coding the estimated channel state information to generate an initial bit sequence comprises:

extracting, respectively by the communication caller and the communication responder, random channel information from each bit of channel state information in the sequences $S_A$ and $S_B$, and coding related random channel information to generate the initial bit sequence.

3. The network key generation method based on a random channel and DH negotiation according to claim 2, wherein the process of negotiating, by the two communication parties, about the initial bit sequence and generating consistent end-to-end keys via the network comprises:

dividing, by the two communication parties, the respectively generated initial bit sequence into M sub-sequences; and respectively generating a new common sequence based on a DH negotiation algorithm by calculation, and transmitting the respectively generated common sequences to each other via the network; and upon receiving the common sequence transmitted by another party of the two communication parties, obtaining, by the two communication parties, consistent end-to-end keys according to the DH negotiation algorithm by using the respectively generated initial bit sequences.

4. The network key generation method based on a random channel and DH negotiation according to claim 3, wherein the process of generating the new common sequence based on the DH negotiation algorithm is as follows:

converting, by the communication caller, the M sub-sequences obtained after division into decimal numbers successively, and combining the decimal numbers into a decimal initial sequence which is recorded as $X_A=\{x_A(1), x_A(2), \ldots, x_A(m), \ldots, x_A(M)\}$, wherein $X_A(m)$ denotes the mth decimal number in the initial sequence $X_A$ generated by the communication caller, and m is an integer from 1 to M;

converting, by the communication responder, the M sub-sequences obtained after division into decimal numbers successively, and generating an initial sequence which is recorded as $X_B=\{x_B(1), x_B(2), \ldots, x_B(m), \ldots, x_B(M)\}$, wherein $X_B(m)$ denotes the mth decimal number in the initial sequence $x_B$ generated by the communication responder;

in addition, generating, by the communication caller, a set of binary information (p,g), wherein p is a prime number and g is an integer, and a set $\{g^x \bmod p|x=1,2,\ldots,p-1\}$ is equivalent to a set $\{1,2,\ldots,p-1\}$, mod denoting a remainder operator; and performing, by the communication caller, calculation according to the initial sequence $X_A$ and the binary information (p,g) by using the following formula, to obtain a common sequence element $y_A(m)$:

$$y_A(m) = g^{x_A(m)} \bmod p$$

wherein m is an integer from 1 to M; combining $Y_A(m)$ obtained after calculation into a common sequence which is recorded as $Y_A=\{y_A(1), y_A(2), \ldots, y_A(m), \ldots, y_A(M)\}$; and afterwards, transmitting, by the communication caller, the common sequence $Y_A$ and the binary information (p,g) generated by itself to the communication responder via the network;

meanwhile, performing, by the communication responder, calculation according to the initial sequence $X_B$ and the binary information (p,g) generated by itself by using the following formula, to obtain a common sequence element $y_B(m)$:

$$y_B(m) = g^{x_B(m)} \bmod p$$

wherein m is an integer from 1 to M; combining $Y_B(m)$ obtained after calculation into a common sequence which is recorded as $Y_B=\{y_B(1), y_B(2), \ldots, y_B(m), \ldots, y_B(M)\}$; and afterwards, transmitting, by the communication responder, the common sequence $Y_B$ generated by itself to the communication caller via the network.

5. The network key generation method based on a random channel and DH negotiation according to claim 4, wherein the process of obtaining the end-to-end keys according to the DH negotiation algorithm is as follows:

upon receiving the common sequence $Y_B$ from the communication responder via the network, performing, by the communication caller, calculation by means of the prime number p and the initial sequence $X_A$ generated by itself by using the following formula, to obtain a key sequence element $z_A(m)$:

$$z_A(m) = y_B(m)^{x_A(m)} \bmod p$$

wherein m is an integer from 1 to M; combining $z_A(m)$ obtained after calculation into a key sequence which is recorded as $Z_A=\{z_A(1), z_A(2), \ldots, z_A(m), \ldots, z_A(M)\}$;

upon receiving the common sequence $Y_A$ from the communication caller via the network, performing, by the communication responder, calculation by means of the prime number p and the initial sequence $X_B$ generated by itself by using the following formula, to obtain a key sequence element $z_B(m)$:

$$z_B(m) = y_A(m)^{x_B(m)} \bmod p$$

wherein m is an integer from 1 to M; combining $z_B(m)$ obtained after calculation into a key sequence which is recorded as $Z_B=\{z_B(1), z_B(2), \ldots, z_B(m), \ldots, z_B(M)\}$; and finally, coding, by the two communication parties, the key sequences $Z_A$ and $Z_B$ respectively obtained after calculation and converting them into binary bit sequences, to generate consistent end-to-end keys.

6. A network key generation system based on a random channel and Diffie-Hellman (DH) negotiation, comprising:

a signal transceiver; and a controller comprising at least one processor and a memory coupled to the at least one processor, the memory storing instructions that, when executed by the at least one processor, cause the controller to:

receive, via the signal transceiver, a pilot training sequence transmitted N times from a corresponding network access point to each of a communication caller and a communication responder;

after each reception of the pilot training sequence, perform channel estimation processing on a wireless channel used to transmit the pilot training sequence, to obtain one-bit channel state information at an instantaneous moment for each of the communication caller and the communication responder;

merge bits of channel state information obtained after N channel estimations to generate, for each of the communication caller and the communication responder, a wireless channel state information sequence having a length of N bits corresponding to the corresponding network access point;

extract random channel information from each bit of the wireless channel state information sequence and code the random channel information to generate an initial bit sequence; and generate, according to a DH algorithm and by means of the initial bit sequence, a consistent end-to-end key.

7. The network key generation system based on a random channel and DH negotiation according to claim 6, wherein the instructions, when executed by the at least one processor, further cause the controller to:

control transmission, via the signal transceiver, of the pilot training sequence N times from respective network access points assigned to the communication caller and the communication responder;

generate a common sequence according to the DH algorithm based on the initial bit sequence;

transmit the common sequence to another communication party via the network;

receive a common sequence transmitted from the other communication party via the network; and generate the consistent end-to-end key according to the DH algorithm based on the received common sequence and the initial bit sequence.

* * * * *